(12) United States Patent
Porubanova et al.

(10) Patent No.: US 12,519,922 B1
(45) Date of Patent: Jan. 6, 2026

(54) ADJUSTMENT OF A MONOCULAR DISPLAY PARAMETER TO DISPLAY CONTENT

(71) Applicant: Microsoft Technology Licensing, LLC, Redmond, WA (US)

(72) Inventors: Michaela Porubanova, Seattle, WA (US); Gabriele D'Amone, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/896,621

(22) Filed: Sep. 25, 2024

(51) Int. Cl.
| H04N 13/356 | (2018.01) |
| H04N 13/344 | (2018.01) |
| H04N 13/361 | (2018.01) |
| H04N 13/398 | (2018.01) |

(52) U.S. Cl.
CPC ......... *H04N 13/356* (2018.05); *H04N 13/344* (2018.05); *H04N 13/361* (2018.05); *H04N 13/398* (2018.05)

(58) Field of Classification Search
None
See application file for complete search history.

(56) References Cited

U.S. PATENT DOCUMENTS

| 10,515,485 | B2 * | 12/2019 | Mallinson | G02B 26/10 |
| 2012/0176296 | A1 * | 7/2012 | Border | G02B 27/017 345/8 |
| 2023/0061195 | A1 * | 3/2023 | Quinton | G06F 16/50 |
| 2023/0096414 | A1 * | 3/2023 | Nakahara | G03B 43/00 348/148 |
| 2023/0166614 | A1 * | 6/2023 | Lee | H02J 7/342 701/41 |
| 2023/0182723 | A1 * | 6/2023 | Lim | B60W 30/143 701/301 |

\* cited by examiner

*Primary Examiner* — Talha M Nawaz
(74) *Attorney, Agent, or Firm* — Workman Nydegger

(57) ABSTRACT

A service configures a monocular display parameter associated with a virtual stimulus to achieve optimized viewing of the virtual stimulus on only one display of an ER system. The service determines that the ER system is operating in a monocular mode. The service accesses the monocular display parameter that is associated with the virtual stimulus. The monocular display parameter is applicable when the ER system is operating in the monocular mode. In response to determining that the ER system is operating in the monocular mode, the service causes the virtual stimulus to be displayed on only the one display. Beneficially, the virtual stimulus is displayed using the monocular display parameter.

20 Claims, 13 Drawing Sheets

ADJUSTMENT OF A MONOCULAR DISPLAY PARAMETER TO DISPLAY CONTENT

BACKGROUND

Head mounted devices (HMDs), or other wearable devices, are becoming highly popular. These types of devices are able to provide a so-called "extended reality" experience.

The phrase "extended reality" (ER) is an umbrella term that collectively describes various different types of immersive platforms. Such immersive platforms include virtual reality (VR) platforms, mixed reality (MR) platforms, and augmented reality (AR) platforms. The ER system provides a "scene" to a user. As used herein, the term "scene" generally refers to any simulated environment (e.g., three-dimensional (3D) or two-dimensional (2D)) that is displayed by an ER system.

For reference, conventional VR systems create completely immersive experiences by restricting their users' views to only virtual environments. This is often achieved through the use of an HMD that completely blocks any view of the real world. Conventional AR systems create an augmented-reality experience by visually presenting virtual objects that are placed in the real world. Conventional MR systems also create an augmented-reality experience by visually presenting virtual objects that are placed in the real world, and those virtual objects are typically able to be interacted with by the user. Furthermore, virtual objects in the context of MR systems can also interact with real world objects. AR and MR platforms can also be implemented using an HMD. ER systems can also be implemented using laptops, handheld devices, HMDs, and other computing systems.

Unless stated otherwise, the descriptions herein apply equally to all types of ER systems, which include MR systems, VR systems, AR systems, and/or any other similar system capable of displaying virtual content. An ER system can be used to display various different types of information to a user. Some of that information is displayed in the form of a "hologram." As used herein, the term "hologram" generally refers to image content that is displayed by an ER system. In some instances, the hologram can have the appearance of being a 3D object while in other instances the hologram can have the appearance of being a 2D object. In some instances, a hologram can also be implemented in the form of an image displayed to a user.

Continued advances in hardware capabilities and rendering technologies have greatly increased the realism of holograms and scenes displayed to a user within an ER environment. For example, in ER environments, a hologram can be placed within the real world in such a way as to give the impression that the hologram is part of the real world. As a user moves around within the real world, the ER environment automatically updates so that the user is provided with the proper perspective and view of the hologram. This ER environment is the "scene" mentioned previously.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method for configuring a monocular display parameter associated with a virtual stimulus to achieve optimized viewing of the virtual stimulus on only one display of an extended reality (ER) system, said method including: determining that the ER system is operating in a monocular mode in which the virtual stimulus is to be displayed on only the one display, wherein the one display is structured as a passthrough display in which at least a portion of a scene in which the ER system is operating in is visible, and wherein the virtual stimulus, when displayed, is simultaneously visible with said at least the portion of the scene; accessing the monocular display parameter that is associated with the virtual stimulus, wherein the monocular display parameter is applicable when the ER system is operating in the monocular mode; and in response to determining that the ER system is operating in the monocular mode, causing the virtual stimulus to be displayed on only the one display, wherein the virtual stimulus is displayed using the monocular display parameter.

In some aspects, the techniques described herein relate to a computer system that configures a monocular display parameter associated with a virtual stimulus to achieve optimized viewing of the virtual stimulus on only one display of the computer system, said computer system including: a processor system; and a storage system that stores instructions that are executable by the processor system to cause the computer system to: determine that the computer system is operating in a monocular mode in which the virtual stimulus is to be displayed on only the one display, wherein the one display is structured as a passthrough display in which at least a portion of a scene in which the computer system is operating in is visible, and wherein the virtual stimulus, when displayed, is simultaneously visible with said at least the portion of the scene; access the monocular display parameter that is associated with the virtual stimulus, wherein the monocular display parameter is applicable when the computer system is operating in the monocular mode; and in response to determining that the computer system is operating in the monocular mode, causing the virtual stimulus to be displayed on only the one display, wherein the virtual stimulus is displayed using the monocular display parameter.

In some aspects, the techniques described herein relate to an extended reality (ER) system that configures a monocular display parameter associated with a virtual stimulus to achieve optimized viewing of the virtual stimulus on only one display of the ER system, said ER system including: a processor system; and a storage system that stores instructions that are executable by the processor system to cause the ER system to: determine that the ER system is operating in a monocular mode in which the virtual stimulus is to be displayed on only the one display, wherein the one display is structured as a passthrough display in which at least a portion of a scene in which the ER system is operating in is visible, and wherein the virtual stimulus, when displayed, is simultaneously visible with said at least the portion of the scene; access the monocular display parameter that is associated with the virtual stimulus, wherein the monocular display parameter is applicable when the ER system is operating in the monocular mode; and in response to determining that the ER system is operating in the monocular mode, cause the virtual stimulus to be displayed on only the one display, wherein the virtual stimulus is displayed using the monocular display parameter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

In some ER systems, stereoscopic imagery is presented to each of the two displays thereby creating binocular, vivid, and immersive holograms that are overlaid on the real-world to produce a scene. Sometimes, however, for purposes of visual comfort, dark adaptation, or lack of user distraction, one of the displays might need to be turned off. Notably, user comfort varies significantly between the monocular mode of the ER system (i.e. the mode in which the ER system is displaying content on only a single display) and the binocular mode of the ER system (i.e. the mode in which the ER system is displaying content on two displays, one for each eye). Because of possible binocular disparity in user perception, the holograms (aka "virtual stimuli") often need to be optimized differently depending on the display mode of the ER system. The disclosed embodiments beneficially utilize vision science to optimize the user's experience, where this optimization is based on the display mode of the ER system.

In this regard, the disclosed embodiments bring about numerous benefits, advantages, and practical applications to how virtual stimuli are displayed on an ER system. Because the human visual system processes monocular and binocular content differently (especially when presented against a see-through binocular background), the disclosed embodiments present significant advantages to overall user comfort and user experience. That is, by practicing the disclosed principles, the embodiments are able to not only improve the quality of the resulting imagery but also improve the user's experience with the ER system, particularly by reducing or even entirely eliminating nausea or other discomfort, such as eyestrain.

Advantageously, the disclosed embodiments are able to determine whether the ER system is operating in a monocular mode or a binocular mode. If the system is operating in the monocular mode, then the embodiments customize or tailor a set of "monocular display parameters" in a manner so as to improve user interaction with the system.

For instance, in some aspects, the monocular display parameter includes one or more of the following parameters: a location of content is optimized to prevent binocular rivalry and unnatural eye movements; a display luminance changes so that the content persists through usage; a stimulus contrast is increased; an introduction velocity of content is set to meet or exceed a minimum value so the content is introduced in a speed like fashion; a display resolution (if foveated or flexible) is increased; a field of view (FOV) is decreased; and/or, if multi-focal, a focal plane changes to be more distant so as to avoid eye convergence. By adjusting or implementing these various different parameters, the embodiments are able to significantly improve how virtual stimuli are perceived and displayed when an ER system is operating in a monocular mode.

Figure 1:
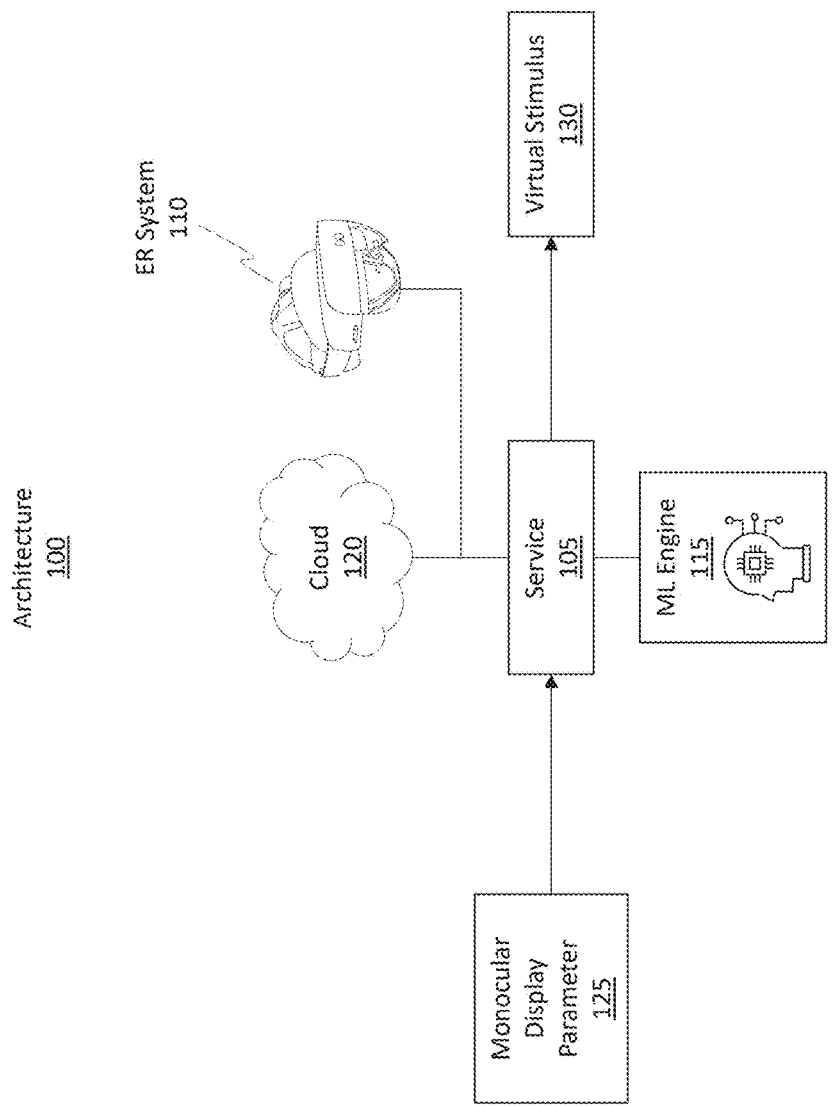
FIG. 1 illustrates an example computer architecture configured to correct for a ghosting effect.

Having just described some of the high level benefits, advantages, and practical applications achieved by the disclosed embodiments, attention will now be directed to FIG. 1, which illustrates an example computing architecture 100 that can be used to achieve those benefits. Architecture 100 includes a service 105, which can be implemented by an ER system 110 comprising an HMD.

As used herein, the phrases ER system, HMD, ER platform, ER device, or wearable device can all be used interchangeably and generally refer to a type of system that displays holographic content (i.e. "holograms" or "virtual stimuli"). In some cases, ER system 110 is of a type that allows a user to see various portions of the real world and that also displays virtualized content in the form of holograms. That ability means ER system 110 is able to provide so-called "passthrough images" to the user. It is typically the case that architecture 100 is implemented on an MR or AR system, though it can also be implemented in a VR system.

Figure 2A:
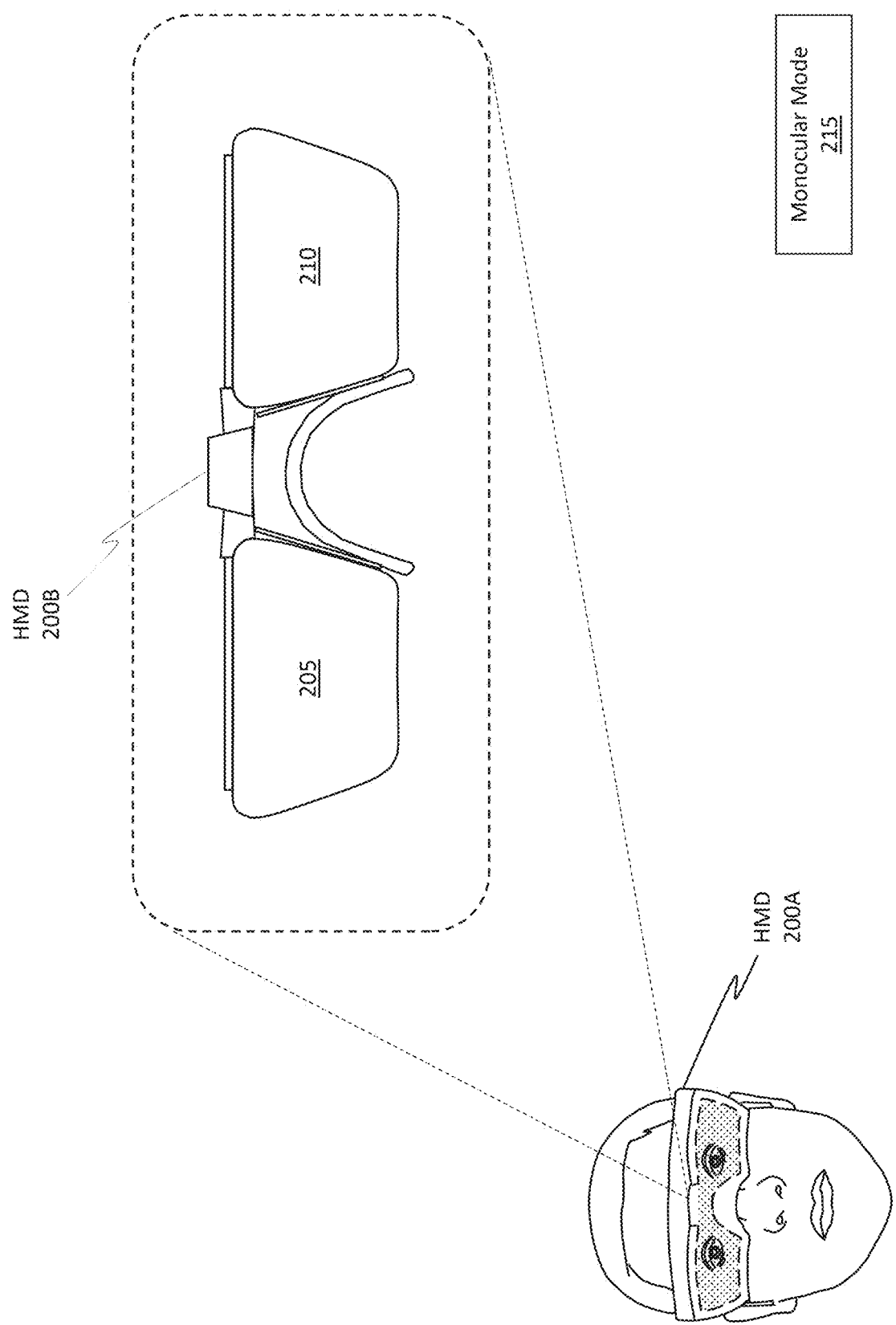
FIGS. 2A and 2B illustrate examples of HMDs.

FIG. 2A shows one example of an ER system that is representative of the ER system 110 of FIG. 1. In particular, FIG. 2A shows an HMD 200A and 200B. HMD 200B is shown as being a multi-display device that includes a first display 205 and a second display 210. The disclosed principles are particularly applicable when the HMD 200B is operating in a monocular mode 215 in which only one of the displays 205 or 210 is displaying content at any given time. Thus, the disclosed embodiments are applicable for ER systems that have two displays, but only one of those displays is displaying content.

Figure 2B:
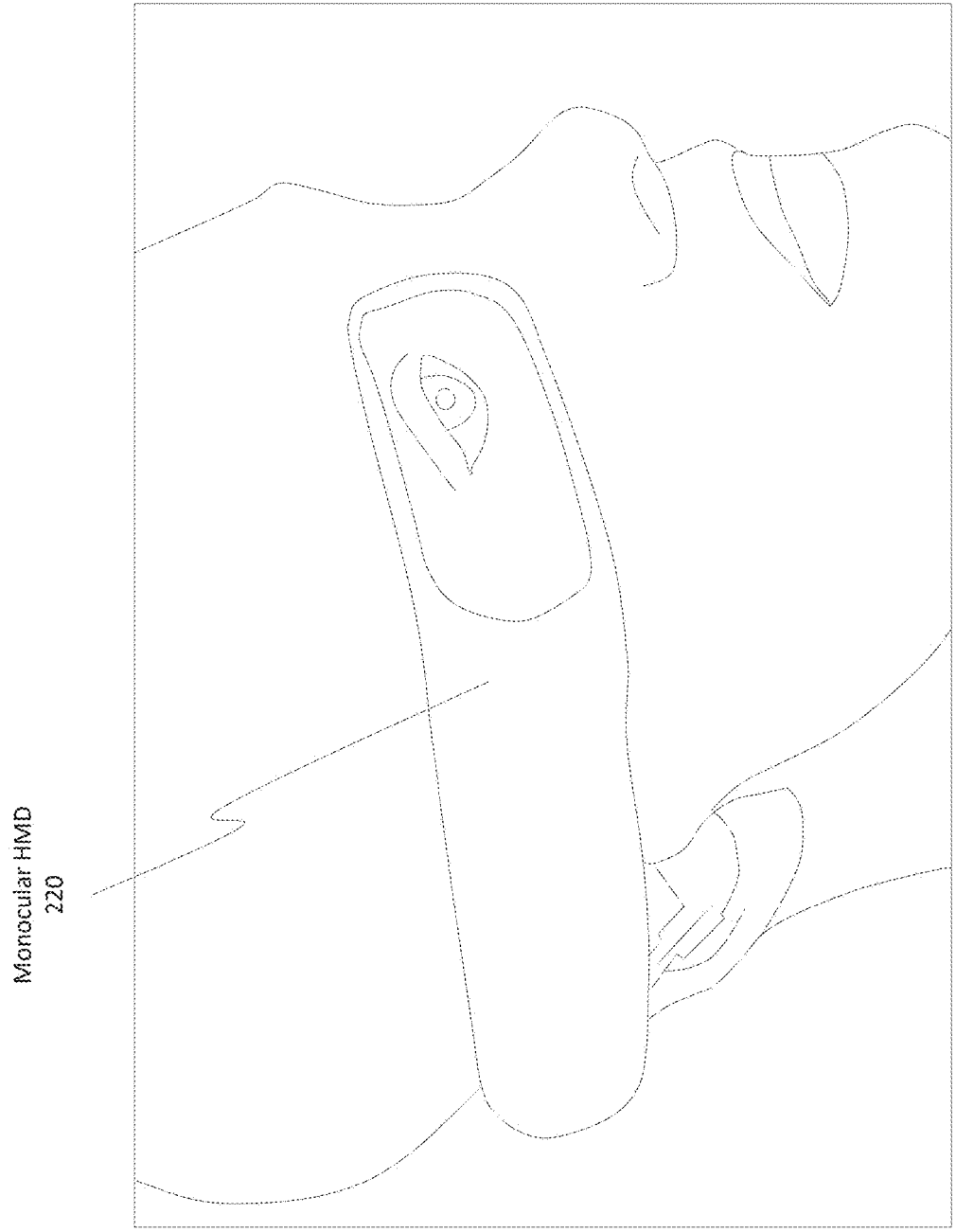

FIG. 2B shows an alternative form factor for the ER system 110 of FIG. 1. In particular, FIG. 2B shows a monocular HMD 220 that includes only a single display as opposed to including multiple displays. Thus, the disclosed embodiments are also applicable for ER systems that have only a single display. When the principles are employed using the monocular HMD 220, the embodiments can infer that the HMD 220 is operating in the monocular mode mentioned previously.

Returning to FIG. 1, as used herein, the term "service" refers to an automated program that is tasked with performing different actions based on input. In some cases, service 105 can be a deterministic service that operates fully given a set of inputs and without a randomization factor. In other cases, service 105 can be or can include a machine learning (ML) or artificial intelligence engine, such as ML engine 115. The ML engine 115 enables the service to operate even when faced with a randomization factor.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some implementations, service 105 is a cloud service operating in a cloud 120 environment. In some implementations, service 105 is a local service operating on a local device, such as the ER system 110. In some implementations, service 105 is a hybrid service that includes a cloud component operating in the cloud 120 and a local component operating on a local device. These two components can communicate with one another.

Service 105 is generally tasked with configuring a monocular display parameter associated with a virtual stimulus to achieve optimized viewing of the virtual stimulus on only one display of the ER system 110. To do so, service 105 determines that the ER system 110 is operating in a monocular mode in which the virtual stimulus is to be displayed on only the one display. This determination can be performed in a variety of ways. For instance, in one way, service 105 can query an operating system of the ER system 110 to determine its display mode. In another way, service 105 can determine whether content is being displayed on one display or multiple displays. This can be achieved either through querying the imaging components of the ER system 110 or by capturing images of the displays and determining whether a hologram is present in only one of the displays.

In another way, service 105 can determine the number of displays ER system 110 has. If ER system 110 has only a single display, then service 105 can automatically infer that ER system 110 is operating in the monocular mode. If ER system 110 has multiple displays, then service 105 can use the techniques mentioned above.

The one display is typically (though not necessarily) structured as a passthrough display. As a result, it is typically the case that at least a portion of a scene in which the ER system 110 is operating in is visible through the display. Thus, when a virtual stimulus is displayed, it is simultaneously visible with at least that portion of the scene.

Service 105 also accesses the monocular display parameter 125, which is associated with the virtual stimulus. The monocular display parameter 125 is applicable when the ER system 110 is operating in the monocular mode. If the ER system 110 is operating in a binocular mode, then a binocular display parameter will be used. Thus, different parameters are used depending on the mode the ER system 110 is operating in.

In response to determining that the ER system 110 is operating in the monocular mode, service 105 causes the virtual stimulus 130 to be displayed on only the one display. Notably, the virtual stimulus 130 is displayed using the monocular display parameter. The remaining figures provide additional examples and supporting illustrations for these principles.

Figure 3:
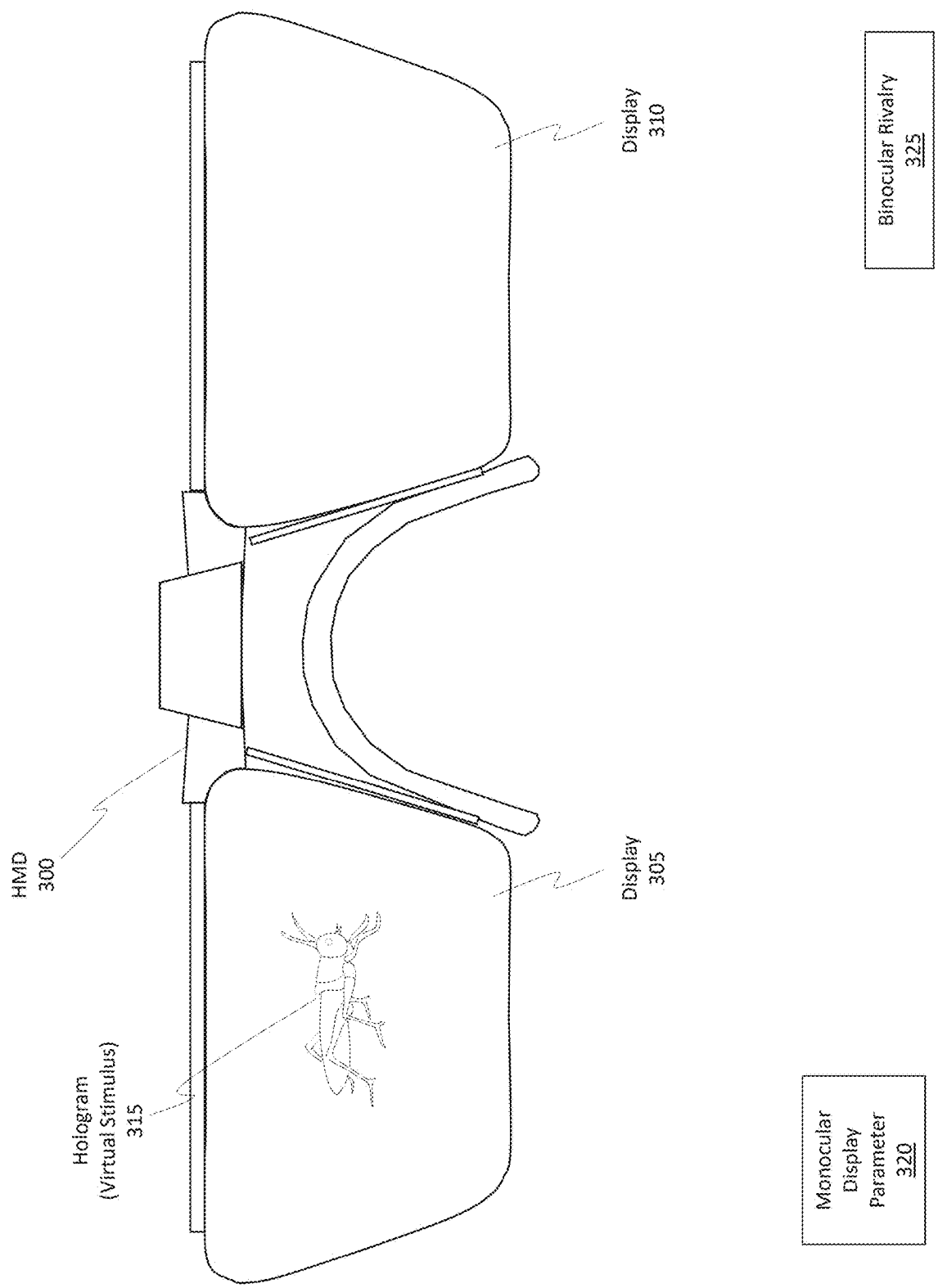
FIG. 3 illustrates use of a monocular display parameter to avoid binocular rivalry.

For example, FIG. 3 shows an example HMD 300 that is representative of the ER system 110 of FIG. 1. HMD 300 is shown as being a multi-display type of device in that HMD 300 includes a first display 305 and a second display 310. Although many of the examples discussed herein are illustrated using a multi-display HMD, the same principles apply when the HMD includes only a single display.

HMD 300 is currently operating in the monocular mode because HMD 300 is displaying a hologram (virtual stimulus) 315 on only the display 305. Because HMD 300 is operating in the monocular mode, service 105 of FIG. 1 will access and employ a monocular display parameter 320, which is representative of the monocular display parameter 125 of FIG. 1. In particular, this monocular display parameter 320 is designed so as to avoid a phenomenon referred to as binocular rivalry 325 that the user can experience as one single retinal image (left or right) alternating in their perception.

Binocular rivalry 325 occurs when the user's eyes observe two different images/content, and the user's brain alternates between dominating or suppressing one of the eyes. Thus, even though both eyes are viewing content, the user's visual system allows the user to perceive only one of the eye's content at any given time. This domination and suppression phenomenon can happen when a hologram is visible by only one eye but not the other, such as in the monocular scenarios described herein.

For instance, regardless of which eye is dominant, the user will either observe or not observe content visible to that eye. Stated differently, even in scenarios where the HMD 300 is operating in the monocular mode, suppression can occur. The disclosed embodiments are designed to tailor the monocular display parameter 320 in such a manner so as to ensure that the hologram 315 remains visible to the user and is not suppressed by the user's brain.

Figure 4:
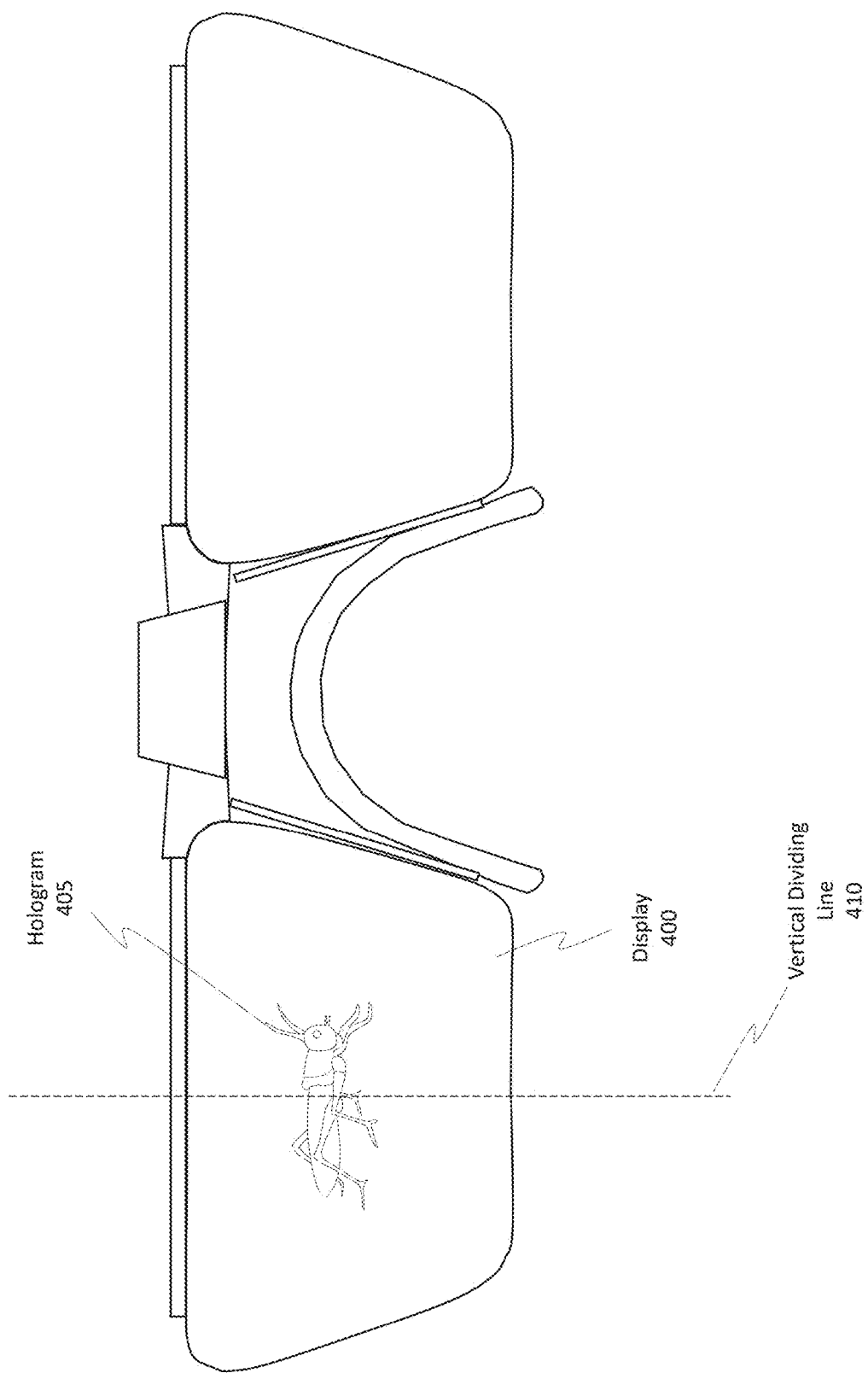
FIG. 4 illustrates an example parameter of the monocular display parameter.

One way in which the monocular display parameter is tailored is shown in FIG. 4. FIG. 4 shows a display 400 displaying a hologram 405. In one scenario, the monocular display parameter is set to include a parameter in which the hologram 405 is displayed at a given position or range of positions in the display 400, where that position(s) is selected to be approximately at or along the vertical center of the display 400, as shown by the vertical dividing line 410. By placing the hologram 405 approximately along the vertical center of the display 400, the hologram 405 commands the user's attention, and the user's brain will not suppress the perception of that hologram 405.

Figure 5:
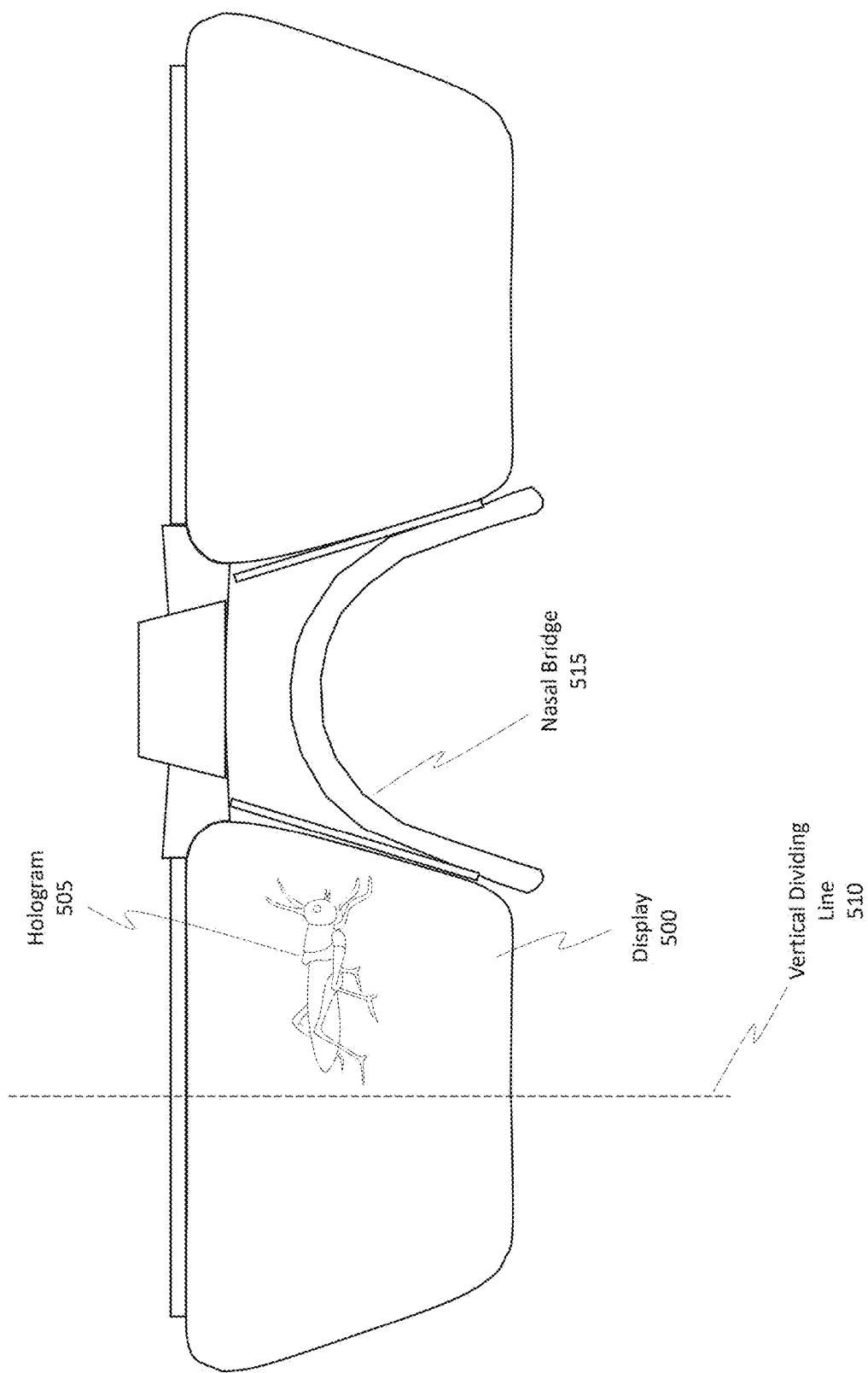
FIG. 5 illustrates another example parameter of the monocular display parameter.

FIG. 5 shows another way in which the monocular display parameter is tailored. FIG. 5 shows a display 500 displaying a hologram 505. FIG. 5 also shows the vertical dividing line 510. In this example scenario, monocular display parameter is set to cause the hologram 505 to be displayed at a position that is generally between the vertical dividing line 510 and a nasal bridge 515 of the HMD. Additionally, or alternatively, the hologram 505 is displayed at a position that is more proximate to a nasal side of the user's visual field as opposed to a templar (or temporal) side of the user's head. By positioning the hologram 505 relatively closer to the nasal side of the uservisual field as opposed to the templar side of the user's visual field, service 105 also commands the user's attention to be directed to the hologram 505, and the user's brain will not suppress the perception of that hologram 505.

Figure 6:
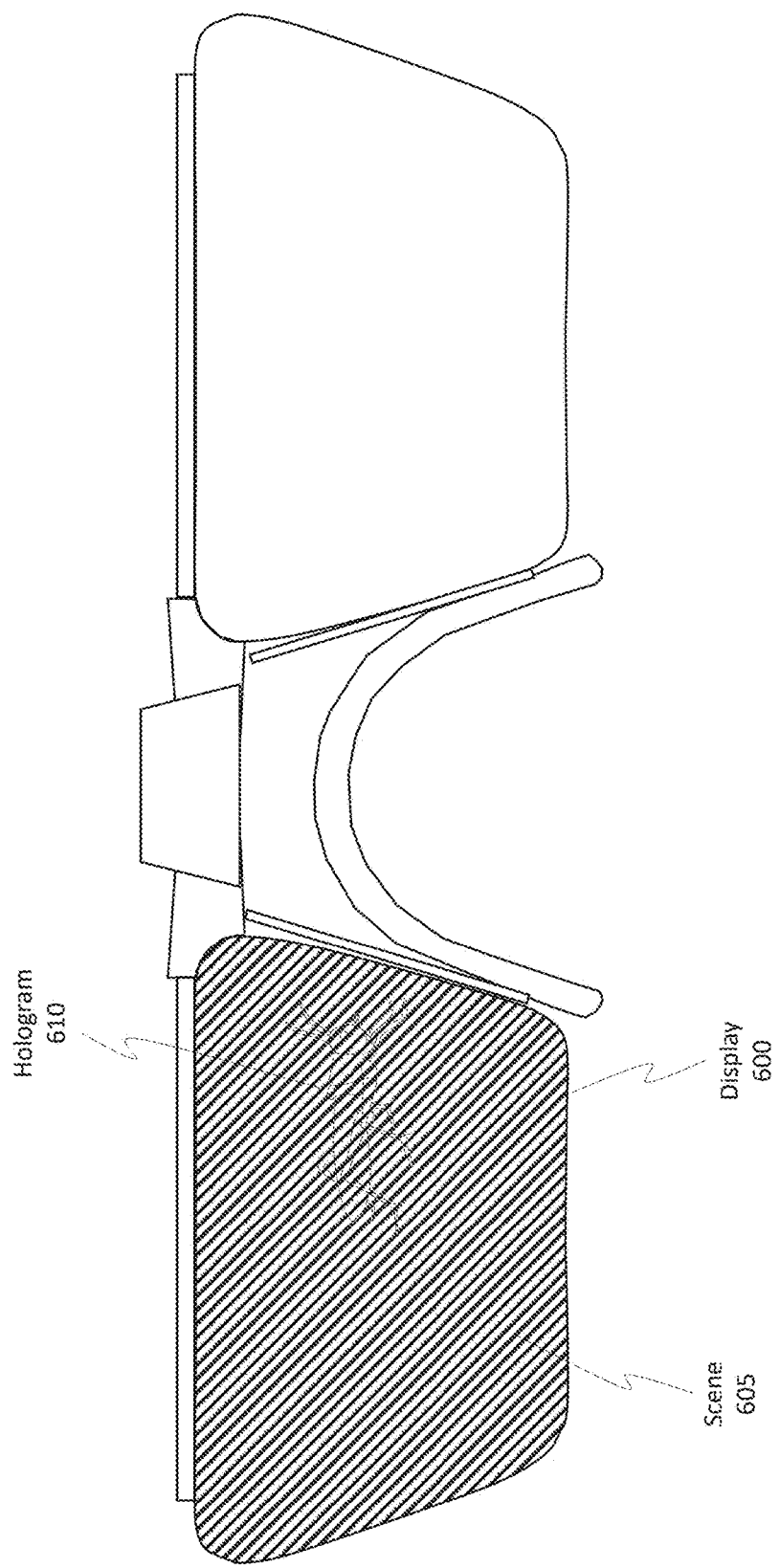
FIG. 6 illustrates another example parameter of the monocular display parameter.

FIG. 6 shows another way in which the monocular display parameter is tailored. FIG. 6 shows a display 600 and a scene 605 in which a hologram 610 is being displayed. The scene 605 not only includes the hologram 610 but it also includes background real-world content. Thus, the display 600 is a passthrough display. Notice, the contrast 615 between the hologram 610 and the background scene content is less than a threshold 620 difference. In accordance with the disclosed principles, the monocular display parameter can be customized in a manner so as to require the contrast 615 to meet or exceed the threshold 620 in order for the content to dominate user perception and avoid binocular rivalry.

Figure 7:
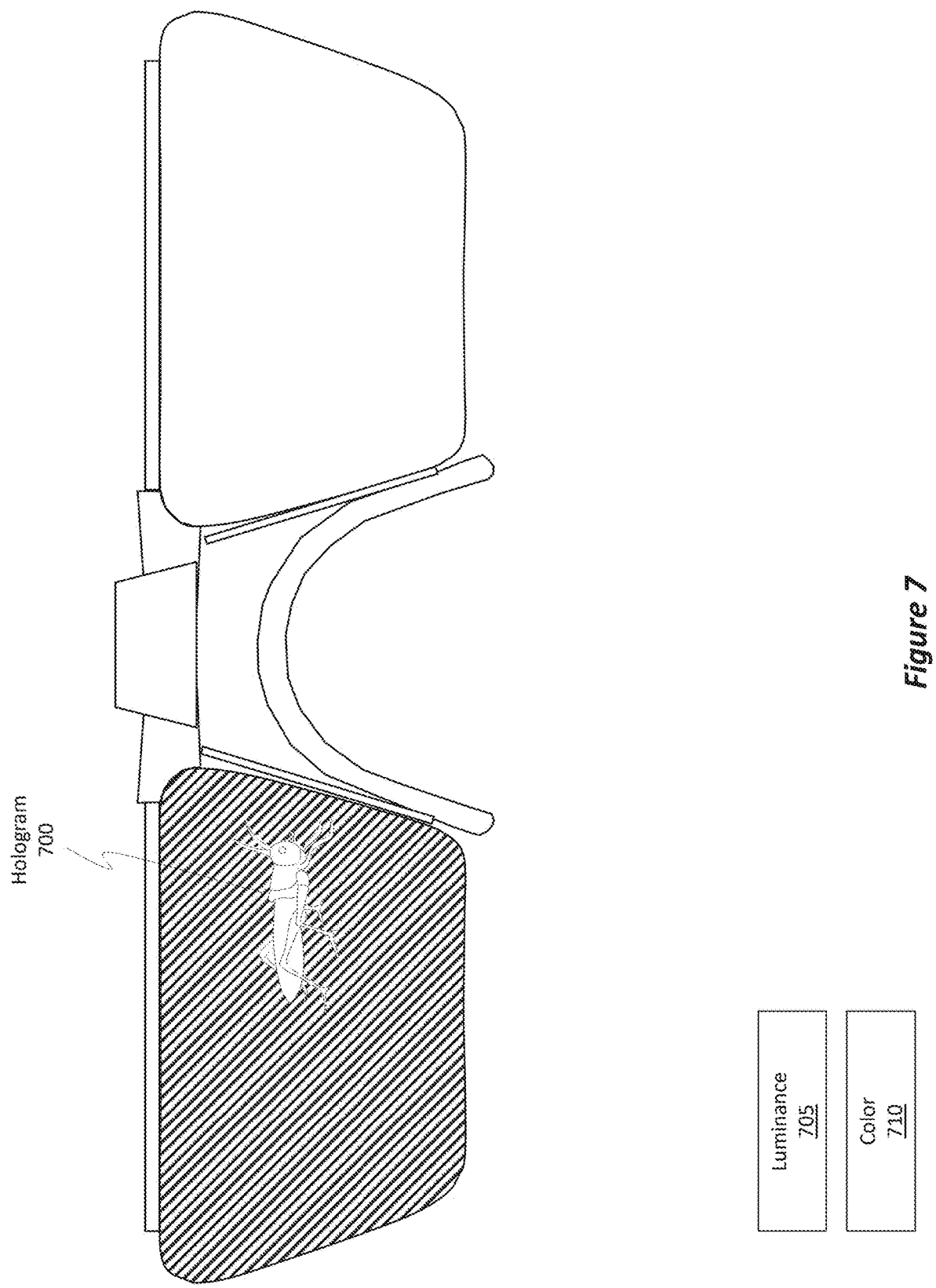
FIG. 7 illustrates another example parameter of the monocular display parameter.

To adjust the contrast 615, service 105 can optionally modify the luminance of the hologram 610 to be brighter than the background scene. In some scenarios, the luminance can be made dimmer to achieve a similar difference in contrast. Additionally, or alternatively, the hologram 610's colors can be modified to achieve a sufficiently high contrast relative to the background scene. As one example, if the background is a forest background that includes a large amount of green content, the hologram 610 (in this case a grasshopper) can have its color modified to include a different shade of green or the inclusion of other colors, such as perhaps brown or black. Additionally, a border can be imposed around the hologram 610, such as a dark border to increase ambient contrast ratio (ratio of contrast between the hologram and real world background). In some cases, the border can be bolded or visually emphasized to assist in calling out and distinguishing the hologram 610 from the background to reduce likelihood of binocular rivalry. Optionally, the border or even the hologram itself can be caused to periodically flash at a given rate selected so as to avoid binocular rivalry (e.g., perhaps once every 3-5 seconds). FIG. 7 is illustrative.

FIG. 7 shows a scenario where the contrast between the hologram 700 and the background scene now meets or exceeds the threshold mentioned previously. This contrast is achieved by adjusting one or both of the luminance 705 of the hologram 700 and the color 710 of the hologram 700. As mentioned previously, other visual aspects of the hologram 700 can be adjusted as well, such as the imposition of a border around the hologram 700. In some cases, the border can directly follow the outer perimeter of the hologram 700. In other cases, the border can be a box-like border (or some other shape) that does not immediately follow the outer perimeter of the hologram 700. In some cases, multiple borders can be used simultaneously, such as the two mentioned above. In some cases, the color of the border can be selected so as to achieve the desired contrast relative to the background scene (e.g., perhaps a bright color different than the background). The color of the background can be determined (e.g., for determining the contrast) by obtaining an image of the scene, regardless of whether the camera observes the background through the display or outside of the display. By adjusting the monocular display parameter to include these features, service 105 can command the user's attention to be directed to the hologram 700, thereby avoiding a scenario where the hologram 700 is suppressed in the user's perceptual system.

Figure 8:
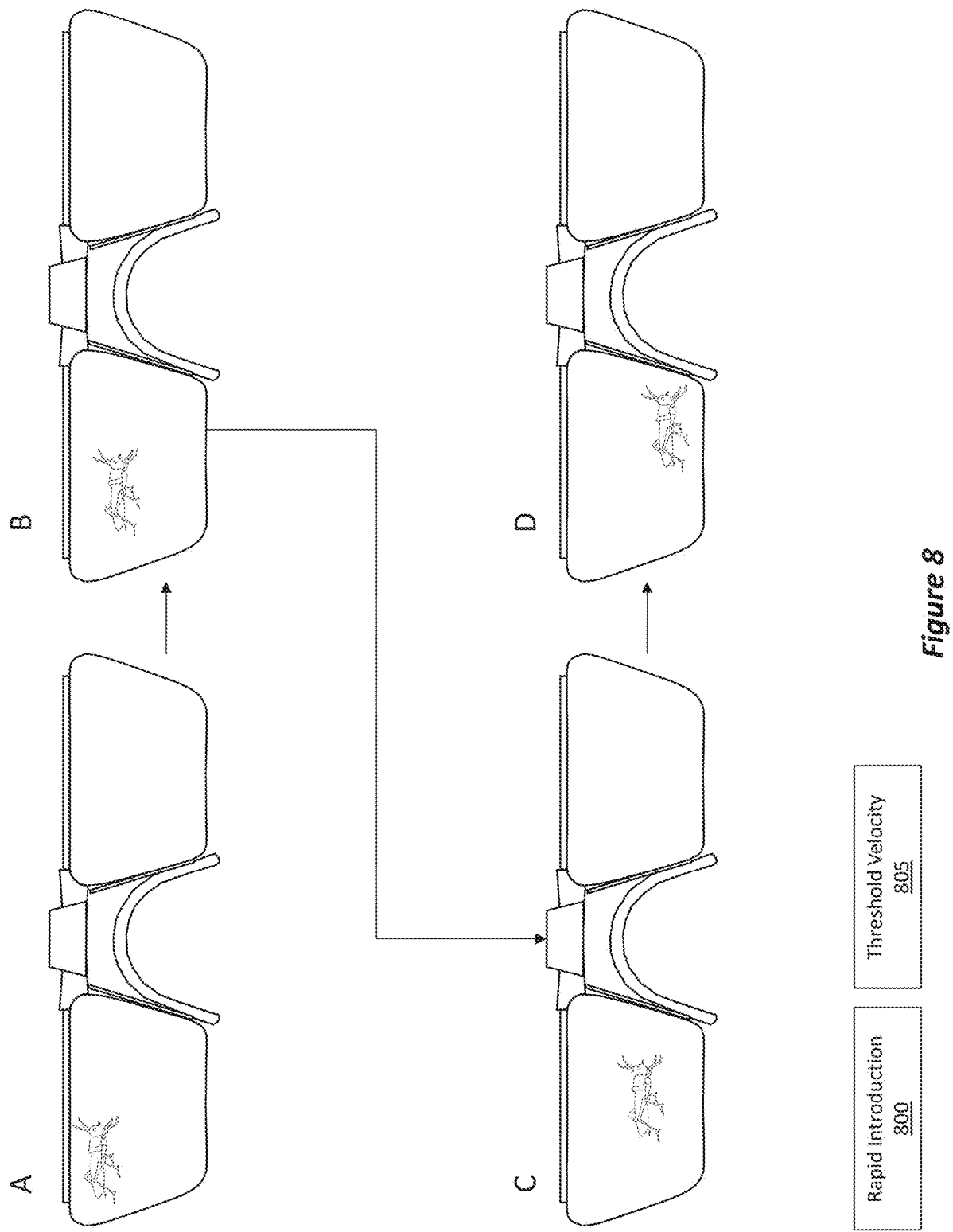
FIG. 8 illustrates another example parameter of the monocular display parameter.

FIG. 8 shows another way in which the monocular display parameter is tailored. In this scenario, the introduction velocity of a hologram is tailored so that the velocity meets or exceeds a minimum velocity threshold. FIG. 8 shows four example depictions (e.g., scenarios "A," "B," "C," and "D") of a hologram being introduced into the scene. Initially, as shown in scenario A, the hologram is introduced at the upper lefthand side of the display. Hologram progressively moves in a downward diagonal manner towards the bottom righthand side of the display, as shown by scenarios B, C, and D. Thus, service 105 can set the monocular display parameter to achieve a rapid introduction 800 of a hologram into the scene by causing the hologram to move at least at a threshold velocity 805 when the hologram is being introduced.

Although the above example focused on a scenario where the hologram was introduced in a specific manner (e.g., from top left to bottom right), a person skilled in the art will appreciate how the hologram can be introduced in any manner, direction, and so on, without restriction. By causing the hologram to be introduced at a minimum velocity, service 105 can ensure that the hologram is not suppressed by the user's perceptual system.

Figure 9:
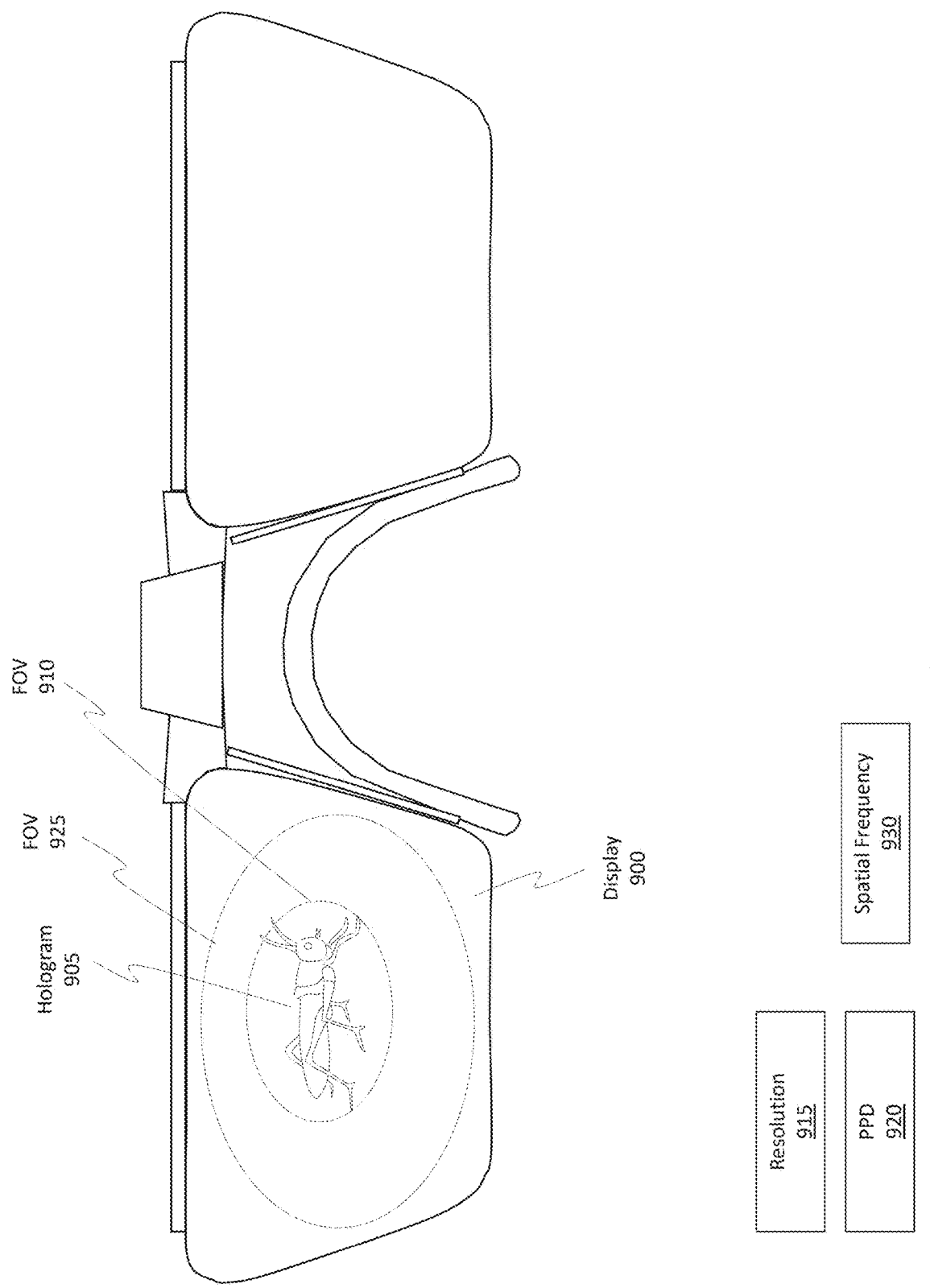
FIG. 9 illustrates another example parameter of the monocular display parameter.

FIG. 9 shows yet another way in which the monocular display parameter can be tailored. FIG. 9 shows a display 900 that is displaying a hologram 905 in a foveated manner such that the hologram 905 is displayed within a specific FOV 910 of the display 900. Initially, the hologram 905 is displayed as having a particular resolution 915 and a number of pixels per degree (PPD 920). Service 105 can modify the FOV of the display 900 to achieve increased resolution and PPD for the hologram 905. For instance, service 105 modifies the FOV of the display 900 to be smaller, as shown by FOV 925, which is smaller than FOV 910. With this smaller FOV 925, the resolution 915 and PPD 920 of the hologram 905 are increased, thereby increasing the spatial frequency 930 of the hologram 905. This increased spatial frequency 930 will cause the hologram 905 to appear crisper and more focused and will also better command the user's attention.

Figure 10:
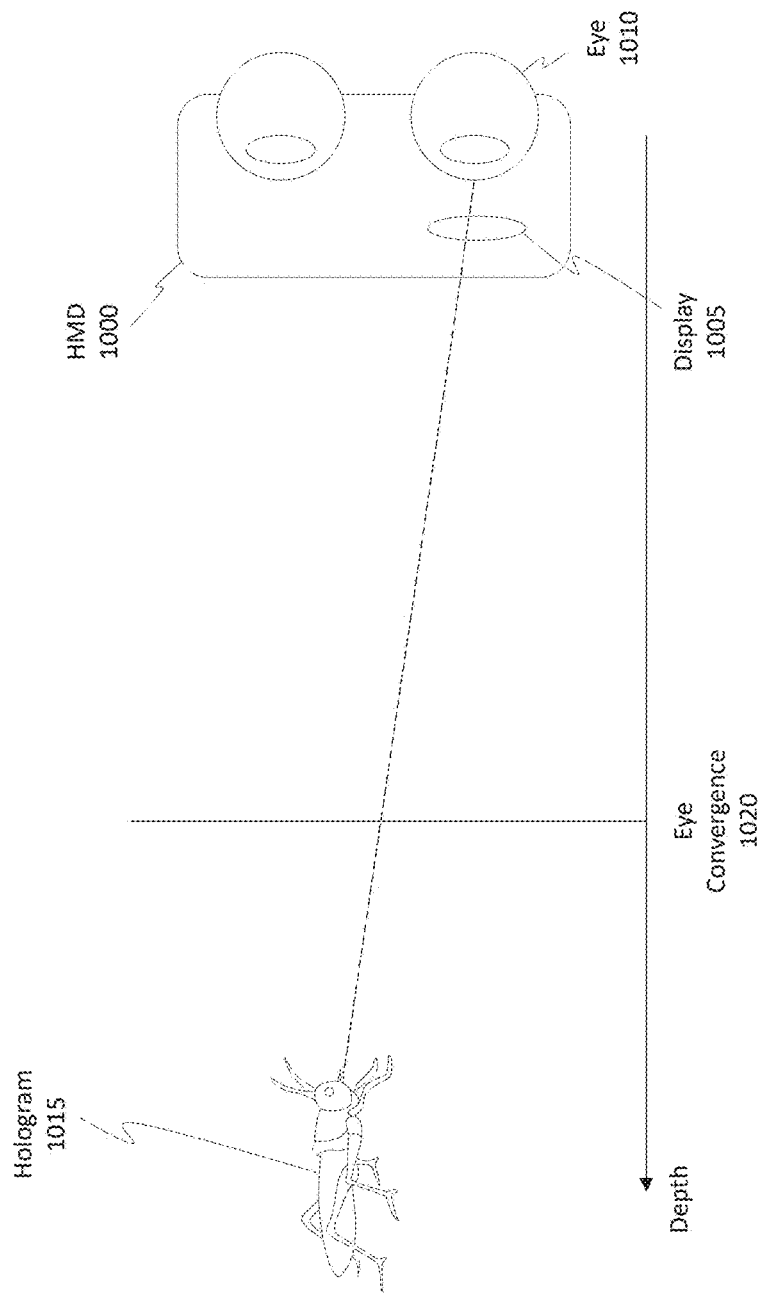
FIG. 10 illustrates another example parameter of the monocular display parameter.

FIG. 10 shows yet another way in which the monocular display parameter can be tailored. FIG. 10 shows an HMD 1000 that is representative of the HMDs mentioned thus far. HMD 1000 includes a display 1005 that is visible to one of the user's eyes, as shown by eye 1010. HMD 1000 is displaying a hologram 1015.

Service 105 is able to set the monocular display parameter so that the focal plane of the HMD 1000 causes the hologram 1015 to appear as being at least a threshold depth away from the user's eye 1010. In particular, this apparent depth is set to a value so that the user's eyes will not converge (convergence is where the eyes move inward to focus on nearby content) and instead will remain substantially parallel to one another. Thus, the depth is at or beyond the eye convergence 1020 depth shown in FIG. 10. In effect, the user's eyes are essentially parallel to one another even though only a single eye 1010 is viewing the hologram 1015. By adjusting the focal plane of the HMD 1000 in a manner so that eye convergence is avoided, service 105 can beneficially facilitate the scenario where the hologram 1015 is not suppressed by the user's perceptual system.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
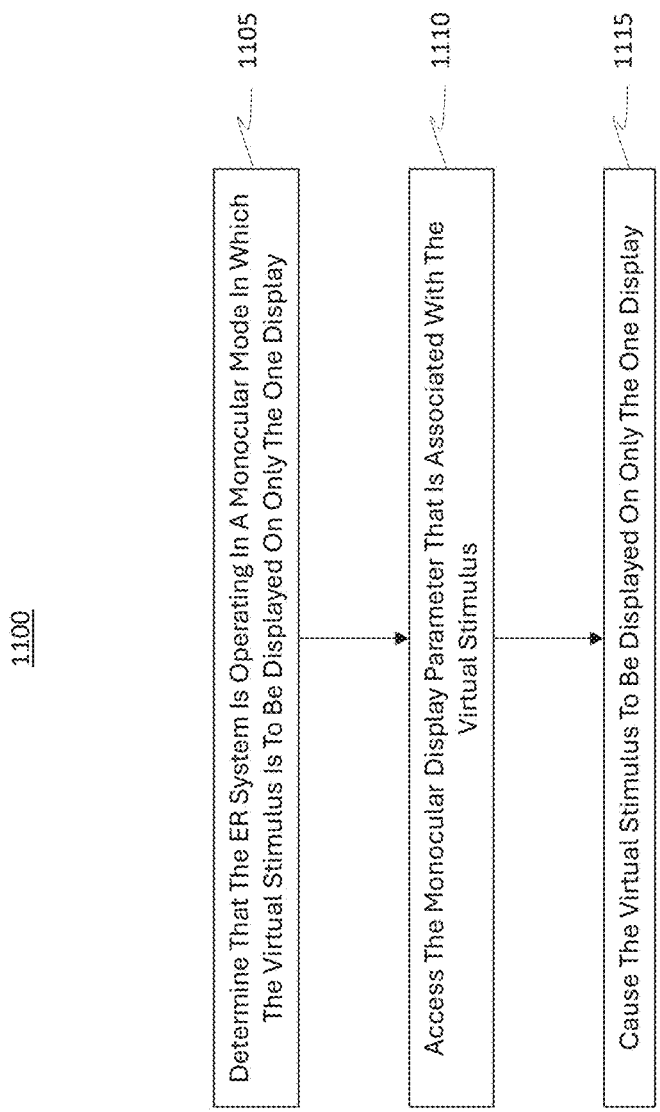
FIG. 11 illustrates a flowchart of an example method for configuring a monocular display parameter associated with a virtual stimulus to achieve optimized viewing of the virtual stimulus on only one display of the ER system.

Attention will now be directed to FIG. 11, which illustrates a flowchart of an example method 1100 for configuring a monocular display parameter associated with a virtual stimulus to achieve optimized viewing of the virtual stimulus on only one display of an extended reality (ER) system. Method 1100 can be implemented within the computing architecture 100 of FIG. 1 and by the ER system 110. Furthermore, method 1100 can be performed by service 105.

Method 1100 includes an act (act 1105) of determining that the ER system is operating in a monocular mode in which the virtual stimulus is to be displayed on only the one display. The one display is structured as a passthrough display in which at least a portion of a scene in which the ER system is operating in is visible. The virtual stimulus, when displayed, is simultaneously visible with at least the portion of the scene.

Optionally, the ER system is a single display system. As another option, the ER system is a multi-display system.

Act 1110 includes accessing the monocular display parameter that is associated with the virtual stimulus. The monocular display parameter is applicable when the ER system is operating in the monocular mode.

The monocular display parameter is at least one of (though it may include any combination of) the following parameters. For instance, the parameters can include a location parameter that requires the virtual stimulus to be displayed on the one display at a location that is within a threshold distance relative to a nasal support of the ER system, as shown in FIG. 5. The location parameter may require the virtual stimulus to be displayed on the one display at a location that is within a threshold distance relative to a nasal side of the user's eyes as opposed to a templar side of the user's eyes, as also shown in FIG. 5.

The parameters include a contrast parameter that requires a contrast between the virtual stimulus and a surrounding region of the scene surrounding the virtual stimulus to meet or exceed a specified contrast threshold, as shown in FIGS. 6 and 7. The parameters include an introduction speed parameter that requires the virtual stimulus to be introduced on the one display using at least a minimum velocity, as shown in FIG. 8.

The parameters include a display resolution parameter that requires a resolution of the virtual stimulus to meet or exceed a specified resolution threshold, as shown by resolution 915 of FIG. 9. The parameters also include a field of view (FOV) parameter that requires an imaging FOV of the one display to not exceed a specified FOV threshold, as shown by FIG. 9. The parameters also include a focal plane parameter that requires a focal plane of the one display to meet or exceed a minimum distance threshold, as shown by FIG. 10. As mentioned above, the monocular display parameter may include a single one of the above parameters or any combination of multiple ones of the above parameters. In some cases, all of the above parameters are included as parts of the monocular display parameter.

In response to determining that the ER system is operating in the monocular mode, act 1115 includes causing the virtual stimulus to be displayed on only the one display. The virtual stimulus is displayed using the monocular display parameter. In doing so, the disclosed embodiments are able to significantly improve the user's experience with the ER system.

Example Computer/Computer Systems

Figure 12:
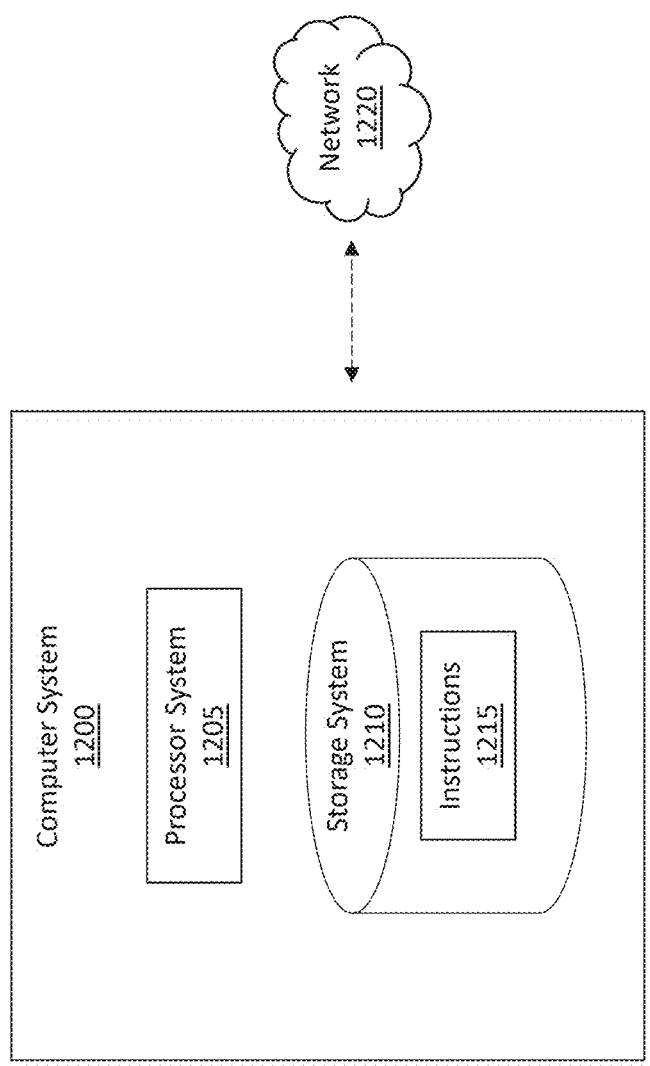
FIG. 12 illustrates an example computer system that can be configured to perform any of the disclosed operations.

Attention will now be directed to FIG. 12 which illustrates an example computer system 1200 that may include and/or be used to perform any of the operations described herein. For instance, computer system can implement service 105 of FIG. 1. Computer system can also take the form of ER system 110.

Computer system 1200 may take various different forms. For example, computer system 1200 may be embodied as a tablet, a desktop, a laptop, a mobile device, or a standalone device, such as those described throughout this disclosure. Computer system 1200 may also be a distributed system that includes one or more connected computing components/devices that are in communication with computer system 1200.

In its most basic configuration, computer system 1200 includes various different components. FIG. 12 shows that computer system 1200 includes a processor system 1205, which may include one or more processor(s) (aka a "hardware processing unit") and a storage system 1210.

Regarding the processor(s) of processor system 1205, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1200. The different components, modules, engines, and services described herein may be implemented as objects or processors that execute on computer system 1200 (e.g. as separate threads).

Storage system 1210 may be physical system memory, which may be volatile, non-volatile, or some combination of the two. The term "memory" may also be used herein to refer to non-volatile mass storage such as physical storage media. If computer system 1200 is distributed, the processing, memory, and/or storage capability may be distributed as well.

Storage system 1210 is shown as including executable instructions 1215. The executable instructions 1215 represent instructions that are executable by the processor(s) of processor system 1205 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1200 may also be connected (via a wired or wireless connection) to external sensors (e.g., one or more remote cameras) or devices via a network 1220. For example, computer system 1200 can communicate with any number devices or cloud services to obtain or process data. In some cases, network 1220 may itself be a cloud network. Furthermore, computer system 1200 may also be connected through one or more wired or wireless networks to remote/separate computer systems(s) that are configured to perform any of the processing described with regard to computer system 1200.

A "network," like network 1220, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1200 will include one or more communication channels that are used to communicate with the network 1220. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for configuring a monocular display parameter associated with a virtual stimulus to achieve optimized viewing of the virtual stimulus on only one display of an extended reality (ER) system, said method comprising:
   determining that the ER system is operating in a monocular mode in which the virtual stimulus is to be displayed on only the one display, wherein the one display is structured as a passthrough display in which at least a portion of a scene in which the ER system is operating in is visible, and wherein the virtual stimulus, when displayed, is simultaneously visible with said at least the portion of the scene;
   accessing the monocular display parameter that is associated with the virtual stimulus, wherein the monocular display parameter is applicable when the ER system is operating in the monocular mode; and
   in response to determining that the ER system is operating in the monocular mode, causing the virtual stimulus to be displayed on only the one display, wherein the virtual stimulus is displayed using the monocular display parameter.

2. The method of claim 1, wherein the monocular display parameter is one of:
   a location parameter that requires the virtual stimulus to be displayed on the one display at a location that is within a threshold distance relative to a nasal support of the ER system;
   a contrast parameter that requires a contrast between the virtual stimulus and a surrounding region of the scene surrounding the virtual stimulus to meet or exceed a specified contrast threshold;
   an introduction speed parameter that requires the virtual stimulus to be introduced on the one display using at least a minimum velocity;
   a display resolution parameter that requires a resolution of the virtual stimulus to meet or exceed a specified resolution threshold;

a field of view (FOV) parameter that requires an imaging FOV of the one display to not exceed a specified FOV threshold; or a focal plane parameter that requires a focal plane of the one display to meet or exceed a minimum distance threshold.

3. The method of claim 1, wherein the ER system is a single display system.

4. The method of claim 1, wherein the ER system is a multi-display system.

5. The method of claim 1, wherein the monocular display parameter is a location parameter that requires the virtual stimulus to be displayed on the one display at a location that is within a threshold distance relative to a nasal support of the ER system.

6. The method of claim 1, wherein the monocular display parameter is a contrast parameter that requires a contrast between the virtual stimulus and a surrounding region of the scene surrounding the virtual stimulus to meet or exceed a specified contrast threshold.

7. The method of claim 1, wherein the monocular display parameter is an introduction speed parameter that requires the virtual stimulus to be introduced on the one display using at least a minimum velocity.

8. The method of claim 1, wherein the monocular display parameter is a display resolution parameter that requires a resolution of the virtual stimulus to meet or exceed a specified resolution threshold.

9. The method of claim 1, wherein the monocular display parameter is a field of view (FOV) parameter that requires an imaging FOV of the one display to not exceed a specified FOV threshold.

10. The method of claim 1, wherein the monocular display parameter is a focal plane parameter that requires a focal plane of the one display to meet or exceed a minimum distance threshold.

11. A computer system that configures a monocular display parameter associated with a virtual stimulus to achieve optimized viewing of the virtual stimulus on only one display of the computer system, said computer system comprising:

a processor system; and a storage system comprising memory that stores instructions that are executable by the processor system to cause the computer system to:

determine that the computer system is operating in a monocular mode in which the virtual stimulus is to be displayed on only the one display, wherein the one display is structured as a passthrough display in which at least a portion of a scene in which the computer system is operating in is visible, and wherein the virtual stimulus, when displayed, is simultaneously visible with said at least the portion of the scene;

access the monocular display parameter that is associated with the virtual stimulus, wherein the monocular display parameter is applicable when the computer system is operating in the monocular mode; and in response to determining that the computer system is operating in the monocular mode, causing the virtual stimulus to be displayed on only the one display, wherein the virtual stimulus is displayed using the monocular display parameter.

12. The computer system of claim 11, wherein the computer system is a single display system.

13. The computer system of claim 11, wherein the computer system is a multi-display system.

14. The computer system of claim 11, wherein the monocular display parameter is a location parameter that requires the virtual stimulus to be displayed on the one display at a location that is within a threshold distance relative to a nasal support of the computer system.

15. The computer system of claim 11, wherein the monocular display parameter is a contrast parameter that requires a contrast between the virtual stimulus and a surrounding region of the scene surrounding the virtual stimulus to meet or exceed a specified contrast threshold.

16. The computer system of claim 11, wherein the monocular display parameter is an introduction speed parameter that requires the virtual stimulus to be introduced on the one display using at least a minimum velocity.

17. The computer system of claim 11, wherein the monocular display parameter is a display resolution parameter that requires a resolution of the virtual stimulus to meet or exceed a specified resolution threshold.

18. The computer system of claim 11, wherein the monocular display parameter is a field of view (FOV) parameter that requires an imaging FOV of the one display to not exceed a specified FOV threshold.

19. The computer system of claim 11, wherein the monocular display parameter is a focal plane parameter that requires a focal plane of the one display to meet or exceed a minimum distance threshold.

20. An extended reality (ER) system that configures a monocular display parameter associated with a virtual stimulus to achieve optimized viewing of the virtual stimulus on only one display of the ER system, said ER system comprising:

a processor system; and a storage system that stores instructions that are executable by the processor system to cause the ER system to:

determine that the ER system is operating in a monocular mode in which the virtual stimulus is to be displayed on only the one display, wherein the one display is structured as a passthrough display in which at least a portion of a scene in which the ER system is operating in is visible, and wherein the virtual stimulus, when displayed, is simultaneously visible with said at least the portion of the scene;

access the monocular display parameter that is associated with the virtual stimulus, wherein the monocular display parameter is applicable when the ER system is operating in the monocular mode; and in response to determining that the ER system is operating in the monocular mode, cause the virtual stimulus to be displayed on only the one display, wherein the virtual stimulus is displayed using the monocular display parameter.

* * * * *